United States Patent [19]

Morgan

[11] Patent Number: 5,687,784
[45] Date of Patent: Nov. 18, 1997

[54] V-BLADE FOR ATTACHMENT TO A BULLDOZER

[76] Inventor: Robert Morgan, Rte. 8, Box 152, Jasper, Tex. 75951

[21] Appl. No.: 628,015

[22] Filed: Apr. 4, 1996

[51] Int. Cl.⁶ ............................................. A01G 23/02
[52] U.S. Cl. .................................. 144/34.6; 144/34.6
[58] Field of Search ........................ 30/379, 379.5; 37/302; 56/229; 83/846; 144/34.1, 34.6

[56] References Cited

U.S. PATENT DOCUMENTS

| | | | |
|---|---|---|---|
| 2,336,124 | 7/1943 | Phoenix | 144/34.6 |
| 2,633,880 | 4/1953 | Mattson | 144/34.1 |
| 2,701,591 | 2/1955 | Kissner et al. | 144/34.1 |
| 3,004,570 | 10/1961 | Clayton et al. | 144/34.1 |
| 3,033,253 | 5/1962 | Purdy | 144/34.1 |
| 3,302,671 | 2/1967 | Basham | 144/34.1 |
| 3,557,850 | 1/1971 | Owens | 144/34.6 |
| 4,164,247 | 8/1979 | Wolf | 144/34.6 |

*Primary Examiner*—W. Donald Bray
*Attorney, Agent, or Firm*—Fulbright & Jaworski L. L. P.

[57] ABSTRACT

A tree cutting device for attachment to a prime mover, such as a bulldozer is provided. The attachment includes a v-shaped blade and a mounting means for attaching the v-shaped blade to the prime mover. The v-shaped blade comprises a pair of sheer blades joined at a forward convergence point to form the cutting edge of the v-shaped blade and a pair of concave shaped blades attached to the sheer blades so as to form an integral unit. The concave shaped blades in conjunction with the v-shape of the apparatus provide a means of controlling and directing the fall of trees being severed by the tree cutting device.

10 Claims, 3 Drawing Sheets

1

V-BLADE FOR ATTACHMENT TO A BULLDOZER

The present invention relates generally to a device which can be attached to a prime mover, such as a bulldozer, and utilized to clear forests or woodland areas and more particularly to a device designed to improve control over the direction of fall and ground placement of trees being cut by the device upon severance of the tree from its base.

BACKGROUND OF THE INVENTION

It has long been the practice to cut trees using various types of cutting attachments mounted on a prime mover. Generally, a cutting blade of some type is mounted on the blade of a prime mover, such as a bulldozer, as is disclosed in U.S. Pat. No. 2,701,591 issued to Kissner et al. Alternatively, an independent front mounted attachment is mounted on a prime mover as is disclosed in U.S. Pat. No. 3,004,570 issued to W. R. Clayton, et al.

A common problem which has been encountered using the various tree cutting devices of the prior art is that controlling the direction of fall and ground placement of the tree upon separation of the trunk of the tree from the stump is difficult if not impossible. The prior art contains numerous cutting devices exhibiting a horizontal cutting blade which effectively severs the tree from the stump, but because these devices lack any means to control and direct the fall of the severed tree, great care is required in the use of such devices to prevent damage to the prime over and/or the operator. In order to prevent such damage, it has been required in the past that chains or ropes be attached to the tree to control the direction of fall, the problem with such methods being that they require additional tools and materials to be utilized as well as requiring additional people to assist in the tree clearing process, thereby increasing the expense and time required to clear trees. It has also been required in the past that the well known technique of notching a tree on the side toward which it leans, and then cutting from the opposite side of the tree inwardly toward the notch until the tree falls due to its own overbalanced position be utilized to allow control over the direction of fall of the tree. Although effective, the use of this technique limits the direction from which the tree cutting device can be brought to bear against the tree and thus requires additional time to position properly the prime mover to which the tree cutting device is attached.

SUMMARY OF THE INVENTION

It is therefore a principal object of the present invention to provide a tree cutting attachment for a prime mover, such as a bulldozer, which will provide increased control over the direction of fall of trees as they are severed from the stump by the tree cutting attachment.

It is a further object of the invention to provide a tree cutting device which can be utilized to cut and control the fall of trees with a minimum amount of manipulation of the prime mover, thereby allowing the cutting of trees from any direction irrespective of the direction in which the tree is leaning.

A further object is to provide a high strength tree cutting device which can be readily installed on the front of a prime mover, such as a bulldozer, with little or no modification of the prime mover, and which may be operated effectively and efficiently by any individual who can operate a bulldozer.

A further object is to provide a tree cutting attachment of great strength and durability, the components of the attachment mutually bracing each other so as to achieve a unitary structure designed to withstand the rigors of clearing large diameter trees.

Thus, in accomplishing the foregoing objects, there is provided in accordance with one embodiment of the present invention an attachment for a prime mover, such as a bulldozer, comprising a v-shaped cutting blade; and mounting means for attaching the v-shaped cutting blade to the prime mover; the v-shaped cutting blade comprising a pair of substantially flat sheer blades which converge at the forward portions thereof to form a v-shaped cutting edge, and a pair of concave blades which likewise converge at the forward portions thereof and extend upwardly from the cutting edge of said pair of converging sheer blades.

The concave blades assist in severing large diameter trees from the stump of the tree by providing an upward separation force on the tree which separates the tree from stump as the blade is moved forward by the prime mover. According to an alternative embodiment, a v-shaped cutting blade is provided for cutting trees. The v-shaped cutting blade according to this embodiment compromises a pair of substantially flat sheer blades which converge at the forward positions thereof to form a v-shaped cutting edge; and a pair of concave blades which likewise converge at the forward portions thereof and extend upwardly from the cutting edge of said pair of converging sheer blades; and a mounting means for attaching said v-shaped cutting blade to a prime mover.

According to one aspect of the invention, the v-shaped cutting edge contain a plurality of teeth for cutting and sawing the trunk of the tree as the sheer blade contacts the tree trunk.

It is another object of the invention that the v-shaped cutting blade contain a vertical splitting element extending from the forward convergence point of the v-shaped cutting edge and the v-shaped blade. The splitting element having flat vertical forwardly converging surfaces for contacting and initially directing the tree in a desired direction as well as providing an initial severing means for separating the tree from its base.

The splitter element may further exhibit a forwardly converging cutting edge having opposing sides with a plurality of teeth found in one of said opposing sides. A support element may also be attached to the splitter element and an upper portion of the v-shaped cutting blade to provide additional support.

These and other features, aspects, advantages and objects of the present invention will become better understood with regard to the following descriptions, appended claims and accompanying drawings.

DETAILED DESCRIPTION OF THE PREFERRED EMBODIMENT

Figure 1:
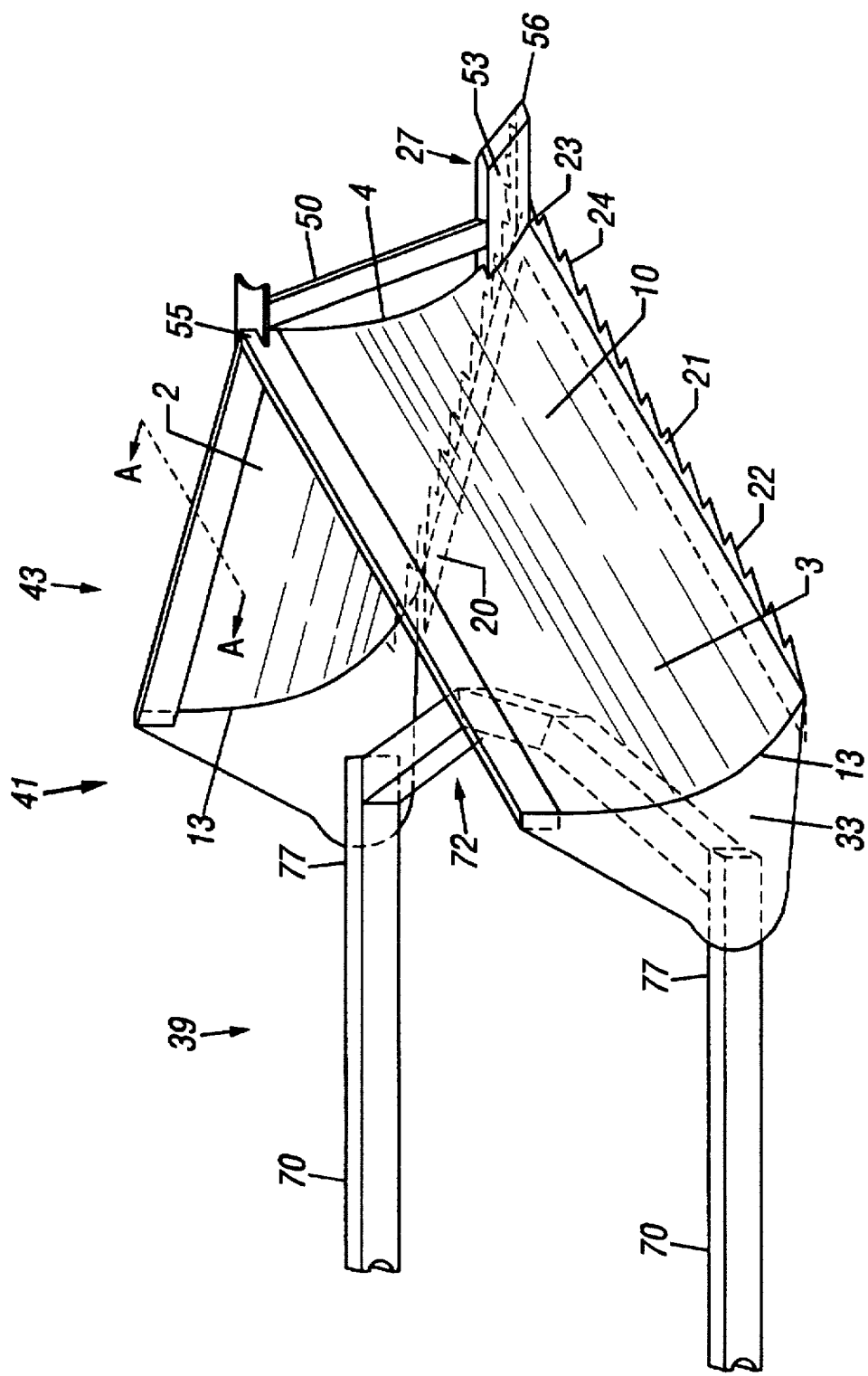
FIG. 1 is a front perspective view of a tree cutting device in accordance with an embodiment of the present invention.
Figure 3:
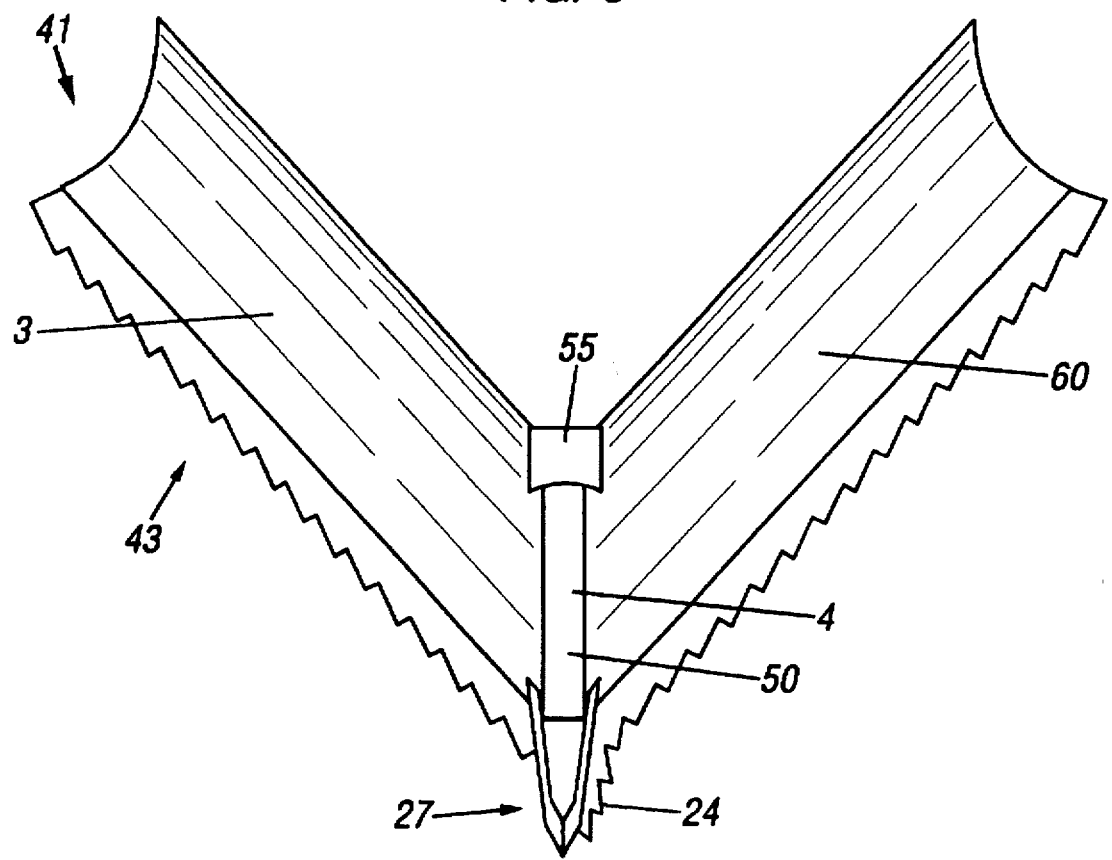
FIG. 3 is a top elevational view of the v-shaped cutting blade portion of the tree cutting device shown in FIG. 1.
Figure 4:
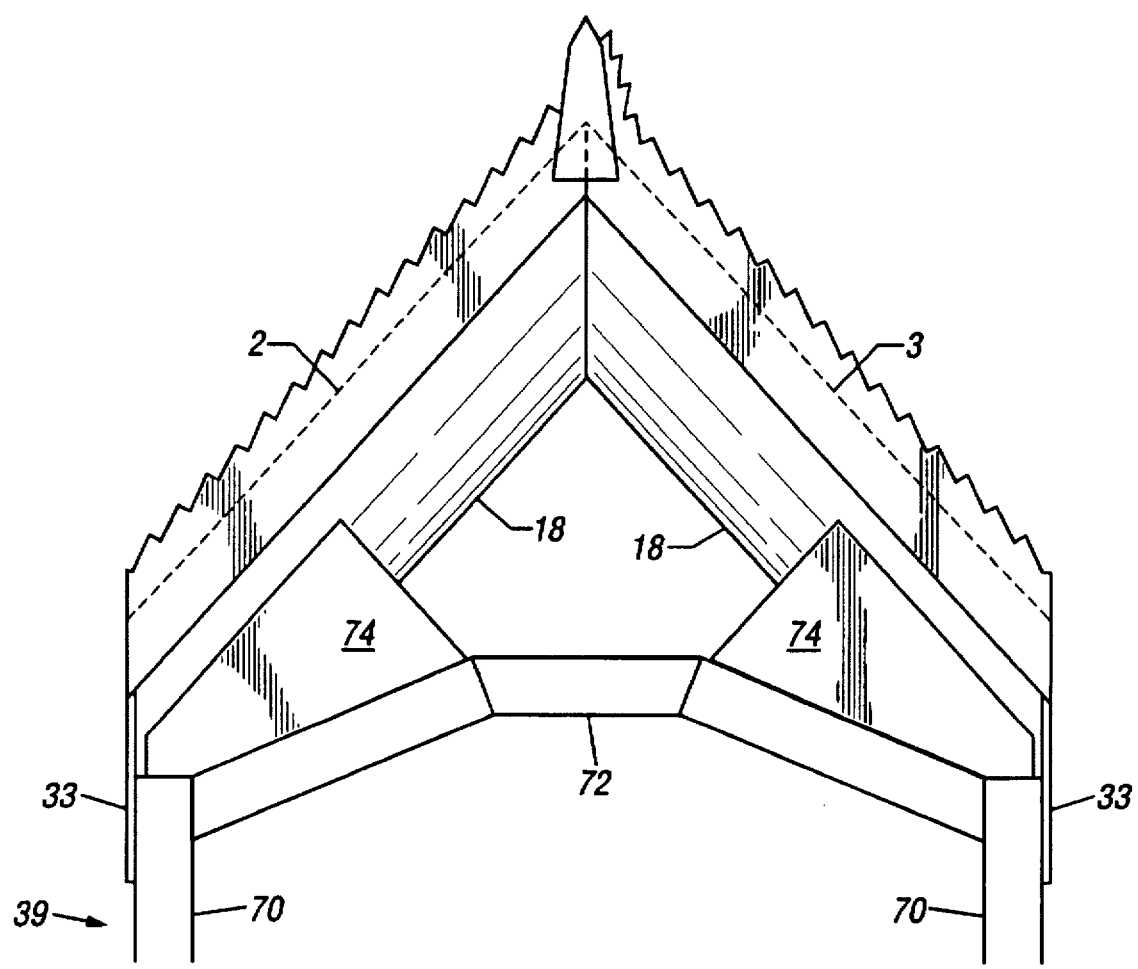
FIG. 4 is a bottom view of the mounting portion of the v-shaped tree cutting device shown in FIG. 1.

Referring generally to FIG. 1, there is shown a generally v-shaped attachment 41 comprising a generally v-shaped blade 43 and a mounting means 39. As is shown in FIG. 1 and FIG. 3, the mounting means 39 comprises a pair of side mounting arms 70. The side mounting arms being of a length and width and having appropriate connection points for mounting the v-blade attachment forwardly of a prime mover (not shown), such as a bulldozer. By means of such mounting, the v-blade attachment, 41 may be vertically and otherwise adjusted in a well known manner. The side arms 70 are generally parallel to each other and are securely connected at their forward ends 77 by a primary cross brace 72. In the preferred embodiment the side arms 70 and the primary cross brace 72 are constructed of Cat C-frame steel tubing (alternatively, they may be made of plating welded to form tubing) and are secured together by welding the forward ends of the side arms 70 to the ends of the primary cross brace 72. As is shown in FIG. 4, the primary cross brace 72 is secured to the v-blade 43 through the use of gussets 74 welded between the primary cross brace 72 and the backing plate 18 of the v-blade 43. In the preferred embodiment, two gussets 74 are utilized in a spaced relationship, such that one gusset 74 is welded between the backing plate 18 of the first concave blade 2 and the primary cross brace 72 and the other gusset 74 is welded between the backing plate 18 of the second concave blade 3 and the primary cross brace 72. The gussets 74 provide a means of connecting the primary cross brace 72 of the mounting means 39 to the v-blade 43 in such a way as to achieve a high strength and torsion resistant tree cutting device in a low cost and easy to manufacture design. In the preferred embodiment the gussets are constructed of A-36 plate steel and are of the dimensions ⅜" thick.

As shown in FIGS. 1 and 4, the side arms 70 are also secured to wings 33; the wings 33 extending rearward from the outer periphery of the first and second concave blades 2 and 3 such that the side arms 70 of the mounting means 39 may be connected thereto by welding or otherwise. In the preferred embodiment, the wings 33 are constructed of A-36 plate and are of the dimensions ⅜" thick. In addition to providing a means of connecting the mounting means 39 to the v-blade 43, the wings 33 prevent trees and other debris from rolling off the outer edges of the v-blade 13 and being dragged under the prime mover.

As is shown in FIG. 1, the v-blade 43 comprises a pair of substantially flat sheer blades 20 and 21 each having a cutting edge 22. The sheer blades 20 and 21 converge at a forward convergence point 23 so as to form a v-shaped blade. Because sheer blades 20 and 21 are identical for purposes of this disclosure, primary reference will be to sheer blade 20, although it is to be understood the disclosure is equally applicable to sheer blades 20 and 21. In a preferred embodiment, the sheer blade 20 is a 1¼ inch steel plate of dimensions 1¼"×24"13' T-1 steel on D8+D7 size 1"×24"× 13' T-1 steel on D6 and smaller size. The cutting edge 22 contains teeth 24 formed therein. The teeth 24 extend along the cutting edge 22. The teeth 24 are angled in a forwardly direction so as to provide the maximum cutting effect when the teeth 24 contact a tree to be felled.

Figure 2:
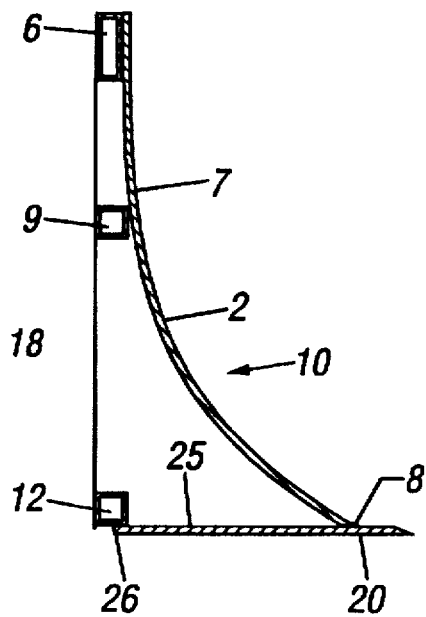
FIG. 2 is a cross sectional view taken along the line A—A of FIG. 1.

As is shown in FIG. 2, the sheer blade 20 is attached at its upper surface 25 to the lower portion 8 of concave blade 2 such that the sheer blade extends forward of the concave blade approximately 6" to 8". This extension is advantageous in that it will allow the sheer blade go in conjunction with the teeth 24 to sever the tree to a predetermined depth prior to the concave blade 2 beginning to direct the tree in a desired direction away from the prime mover as is one of the principal objects of the invention. The rear edge 26 of sheer blade 20 is attached to a bottom tubular support 12. In the preferred embodiment, the bottom tubular support 12 is 4×4×½41 steel tubing.

As is shown in FIGS. 1 and 2, first and second concave blades 2 and 3 are attached to sheer blades 20 and 21 so as to form the v-blade having a concave surface 10. Because first and second concave blades 2 and 3 are identical and are attached to sheer blades 20 and 21 respectively in an identical manner, for purposes of this disclosure primary reference will be to concave blade 2 although it is to be understood the disclosure is equally applicable to concave blades 2 and 3.

In the primary embodiment concave blade 2 has an upper portion 7 and a lower portion 8. Although the concave blade 2 exhibits concavity throughout its entire surface 10 the degree of concavity is greater in the lower portion 8 than in the upper portion 7. Typically, the degree of concavity will be 7" to center of plate. It is critical that the lower portion 8 of the concave blade 2 exhibit the required degree of concavity in order to provide the required directional control over the falling of the tree that is one of the primary features of the claimed invention. In the primary embodiment, the concave blade 2 consists of ⅜" steel plate and is of the dimensions ⅜"×4'×12'6" and is formed from A-36 plate steel. As was previously discussed, the lower portion 8 is attached to the upper surface 25 of the sheer blade 20. The outer edge 13 of the concave blade 2 is attached to the wing 33. The wing 33 provides a sturdy, torsion resistant connection structure between the side arm 70 and the concave blade 2. As is shown in FIG. 2, the upper portion 7 of the concave blade 2 is attached to an upper tubular support 6 and a middle tubular support 9. In the preferred embodiment, the upper tubular support 6 comprises 8×4×½" steel tubing extending for the length of concave blade 2 and being attached to the uppermost portion of concave blade 2 throughout its entire length. A middle tubular support 9 comprising steel tubing 4×4×½" running parallel to upper tubular support 6 is attached to the v-blade 2 at a point approximately 12" below upper tubular support 6. Both upper tubular support 6 and middle tubular support 9 are also attached to backing plate 18. A bottom tubular support 12 connects the rear edge 26 of sheer blade 20 to backing plate 18. In the preferred embodiment, the tubular supports are welded to the respective components with which they are connected. As can be seen in FIG. 2, a concave surface 10 is created by the previously described construction of the v-blade 43 such that trees which are being cut by the v-blade attachment 41 are directed up and angled away from the stump portion of the tree, thereby protecting both the prime mover and the operator of the prime mover from damage caused by falling trees and allowing trees to be quickly and efficiently cut and cleared.

As can be seen in FIG. 1, a splitter element 27 extends from the forward convergence point 23 of sheer blades 20 and 21. The splitter element 27 has forward converging surfaces 53 and a vertical tip 56 for severing trees to be cut. As can be seen in FIG. 3, the splitter element 27 contains teeth 24 on one side of the splitter element 27 to assist in the cutting of trees. The teeth 24 are preferably located on one side only to prevent teeth on opposing sides of the splitter from engaging the tree simultaneously causing the splitter element to lock-up in the tree thereby stopping the cutting and splitting of the tree.

As can be seen in FIGS. 1 and 3 a support brace 50 connects the splitter element 27 to an upper portion 55 of the forward convergence point 4 of concave blades 2 and 3. The support brace 50 provides strength to resist the twisting and torsional forces exerted on the splitter element 27 and the v-blade 43 generally in the operation of the v-blade attachment 41.

While the invention has been described in what is presently considered to be preferred embodiment, other modifications will become apparent to those skilled in the art. Thus, it is therefore not intended that the invention be limited to the specific disclosure embodiment but that it be interpreted within the full scope and spirit of the appended claims.

What is claimed is:

1. An attachment for a prime mover, such as a bulldozer, comprising:

a v-shaped cutting blade comprising:
   a pair of substantially flat sheer blades converging at forward portions thereof to form a v-shaped cutting edge, said cutting edge comprising a plurality of teeth formed therein; and
   a pair of concave blades converging at forward portions thereof and extending upwardly from the cutting edge of said pair of converging sheer blades; and
   mounting means for attaching said v-shaped cutting blade to said prime mover.

2. The attachment of claim 1 wherein, each of said sheer blades has an upper surface; and
   each of said concave blades has an upper and lower portion, said lower portion of said concave v-shaped blades being welded to said respective upper surface of said flat sheer blades.

3. The attachment of claim 1 further comprising:

a splitter element having flat vertical forwardly converging surfaces, said splitter element extending from the forward convergence point of said sheer blades.

4. The attachment of claim 3 wherein, said splitter element has a forwardly converging cutting edge, said cutting edge having opposed sides, one of said sides exhibiting a plurality of teeth formed therein.

5. The attachment of claim 3 further comprising:

a support element, said support element connecting said splitter element to an upper portion of said v-shaped cutting blade such that said support element secures said splitter element to said v-shaped cutting blade.

6. A v-shaped cutting blade for sawing trees comprising:

a pair of substantially flat sheer blades converging at forward portions thereof to form a v-shaped cutting edge, said cutting edge comprising a plurality of teeth formed therein;
   a pair of concave blades converging at forward portions thereof and extending upwardly from the cutting edge of said pair of converging sheer blades; and
   mounting means for attaching said v-shaped cutting blade to a prime mover.

7. The attachment of claim 6 wherein, each of said sheer blades has an upper surface; and
   each of said concave blades has an upper and lower portion, said lower portion of said concave v-shaped blades being welded to said respective upper surface of said flat sheer blades.

8. The attachment of claim 6 further comprising:

a splitter element having flat vertical forwardly converging surfaces, said splitter element extending from the forward convergence point of said sheer blades.

9. The attachment of claim 8 wherein, said splitter element has a forwardly converging cutting edge, said cutting edge having opposed sides, one of said sides exhibiting a plurality of teeth formed therein.

10. The attachment of claim 8 further comprising:

a support element, said support element connecting said splitter element to an upper portion of said v-shaped cutting blade such that said support element secures said splitter element to said v-shaped cutting blade.

* * * * *

UNITED STATES PATENT AND TRADEMARK OFFICE
CERTIFICATE OF CORRECTION

PATENT NO.   : 5,687,784
DATED        : November 18, 1997
INVENTOR(S)  : Robert Morgan It is certified that error appears in the above-identified patent and that said Letters Patent is hereby corrected as shown below:

In column 3, line 7, delete [,] before the occurrence of "41".

In column 4, line 2, delete [41] and substitue therefore -"-.

Signed and Sealed this

Tenth Day of February, 1998

Attest:

BRUCE LEHMAN

Attesting Officer

Commissioner of Patents and Trademarks